March 26, 1935.  C. W. COLLINS  1,995,704
BRAKE MECHANISM
Filed May 2, 1932
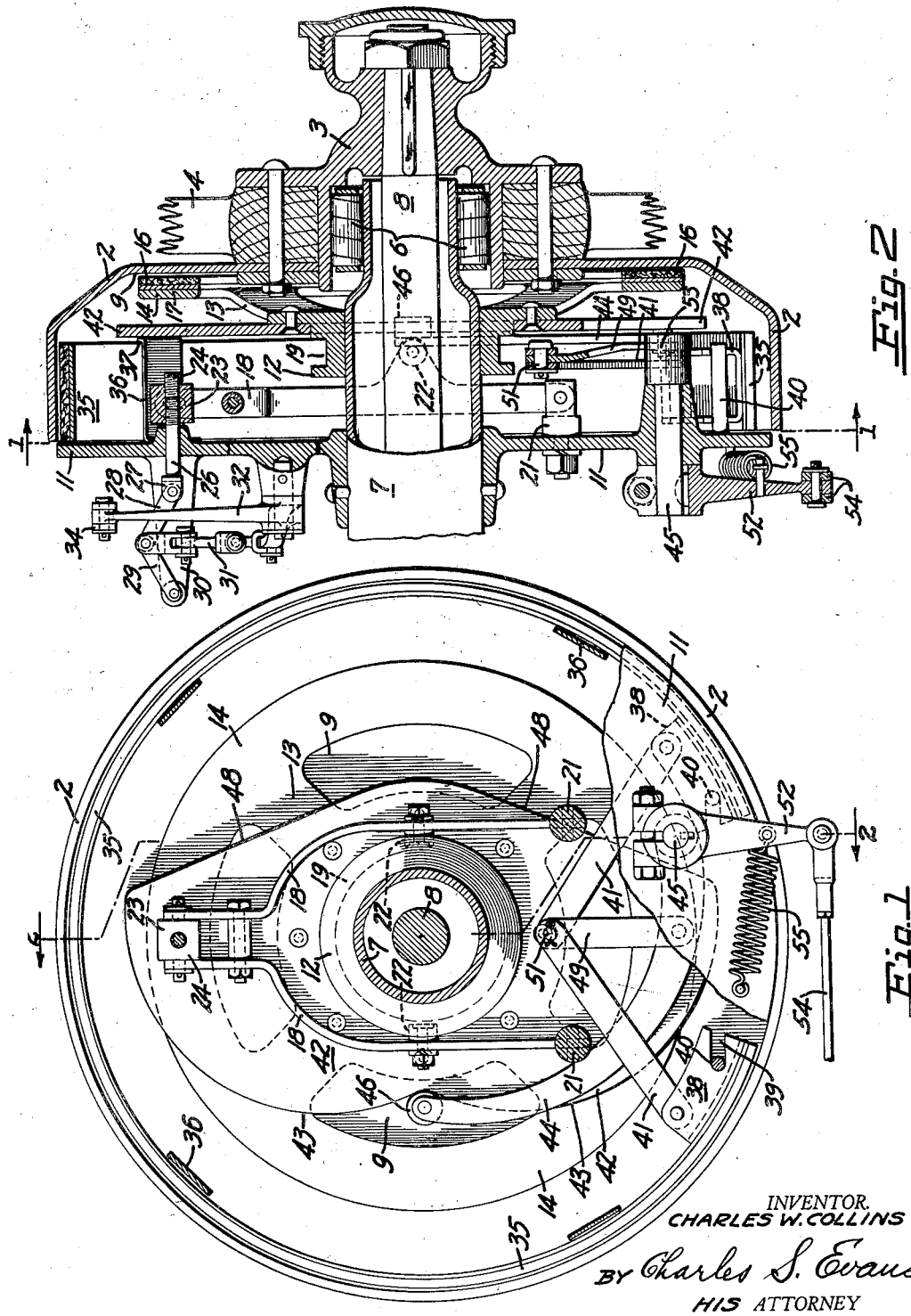
INVENTOR.
CHARLES W. COLLINS
BY Charles S. Evans
HIS ATTORNEY Patented Mar. 26, 1935

1,995,704

UNITED STATES PATENT OFFICE 1,995,704

BRAKE MECHANISM

Charles W. Collins, Seattle, Wash.

Application May 2, 1932, Serial No. 608,691

9 Claims. (Cl. 188—140)

My invention relates to a brake mechanism, and particularly to a mechanism in which a clutch is embodied in the brake drum to actuate the brake band.

It is among the objects of my invention to provide improved means for actuating the clutch.

Another object of my invention is to provide improved mechanism for operating the brake band from the clutch.

Still another object of my invention is to provide means for positively indicating when the brake band is worn to a certain point.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a transverse vertical sectional view of the brake mechanism embodying my invention, taken in a plane indicated by the line 1—1 of Figure 2; portions of the view being shown in elevation to disclose the construction more clearly.

Figure 2 is a longitudinal vertical sectional view of the brake mechanism, taken in a plane indicated by the line 2—2 of Figure 1; portions of a vehicle wheel and mounting being shown to indicate the operative relationship.

In terms of broad inclusion, the brake embodying my invention comprises a brake drum and a brake band engageable with the drum. Mechanism including a cam having a plurality of cam surfaces are provided for moving the brake band into engagement with the drum; one of the cam surfaces operating to engage the band more rapidly than another of said surfaces. Means controlled by the movement of the band are provided for conditioning the mechanism to engage the band by a predetermined one of the cam surfaces, and means are provided for operating the mechanism.

By this arrangement the brake may be designed to engage the band more rapidly when the band is worn than when it is in good condition. This serves to indicate to the driver when the linings need replacement. In the preferred form of my invention the mechanism comprises a cam having a plurality of cam surfaces, and a follower connected to engage the band upon rotation of the cam, and positioning the follower on a predetermined one of the cam surfaces.

In greater detail, the brake mechanism embodying my invention comprises a drum 2 secured to the hub 3 of a vehicle wheel 4. The wheel is shown as being mounted on the roller bearings 6 which run on the axle housing 7 in the usual manner; the drive for the wheel being provided by the live axle 8. The drum 2 differs from that found in the ordinary brake only in having its disk surface 9 smoothly finished to provide a clutch surface. A disk 11 mounted on the axle housing 7 provides a backing plate for the brake drum 2.

Slidably and rotatably mounted on the axle housing 7, within the brake drum 2, is an annular ring 12 carrying a clutch member or disk 13; this disk being dished to clear the wheel hub and drum mounting, and having a peripheral flange 14 faced with a frictional material 16. The frictional material is preferably mounted on a thin ring 17. Any suitable substance may be used in the material 16, providing a frictional surface is presented which will engage smoothly and easily and disengage instantly.

Means are provided for moving the clutch member 13 into engagement with the clutch surface 9 of the drum 2, and to this end a yoke 18 is provided straddling the annular groove 19 in the clutch member hub ring 12. The yoke 18 is pivotally mounted within the brake drum 2 on the studs 21 secured to the backing plate 11, and is provided with the groove engaging rollers 22. A block 23, pivoted in the free end of the yoke 18, is tapped to receive the threaded end 24 of a push rod 26 slidably mounted in the backing plate 11. The threaded arrangement provides means for adjusting the block relative to the push rod. In the final assembly this serves to adjustably position the clutch.

The projected end of the rod 26 is provided with a yoke 27 to which one end of a link 28 is pivoted. A similar link 29 is provided and is pivotally connected between the free end of the link 28 and a bracket 30 mounted on the backing plate 11, to provide a toggle arrangement. The connected ends of the links 28 and 29 are pivoted to the upper end of a universally jointed link 31; the other end of the jointed link being pivoted to one arm of a bell crank 32 mounted on the backing plate 11. The other arm of the bell crank is connected to the clevised end 34 of an operating rod which is connected with the foot pedal of the vehicle. By this arrangement, it is apparent that movement of the foot pedal will cause axial movement of the shaft 26 and cause the yoke 27 to move the clutch member 13 into engagement with the drum clutch surface 9.

Means are provided for utilizing the turning movement of the engaged clutch member to operate a brake mounted within the drum 2. A brake band 35 is disposed about the inner circumference of the brake drum, and is loosely held in position by a series of spaced brackets 36 mounted on the backing plate 11; the upper end of each bracket being turned over to provide a lip 37 engaging the edge of the brake band 35. As best illustrated in Figure 1, the opposing ends of the brake band 35 are each provided with a bracket 38 having the slot 39 engaging a suitable pin 40 fixed to the backing plate 11. The brake band brackets are connected by a pair of pivoted spreader links 41 assembled in the nature of a toggle.

A cam plate 42 having a cam surface 43 of compound curvature, for duplicate action in either direction of the cam movement, is suitably secured to the clutch member 13. A curved lever 44, fixed on the inner end of a shaft 45 journaled in the backing plate 11, is provided with a following roller 46 adapted to ride on the cam surface 43.

In the neutral position of the cam plate the following roller 46 rests in the depression formed by the compound curved cam surface, so that movement of the cam plate in either direction immediately causes an outward movement of the lever 44. The curvature of the cam surface is preferably such that, assuming a constant angular velocity of the cam plate, the lever 44 is moved outwardly at a constant rate as the following roller 46 approaches the end of the cam.

A link 49, pivoted at one end to the lever 44, and at the other end to the common pivot pin 51 of the spreader links 41, operatively connects the lever 44 with the toggle. By this arrangement it is apparent that an outward movement of the lever 44 operates to spread the links 41, and consequently the opposing ends of the brake band 35, to effect engagement of the brake band with the drum 2. This engageemnt will be effected regardless in which direction the wheel carrying the mechanism happens to be rotating. In this connection, it is to be noted that the specific mounting of the brake band 35 plays an important role, because the band is free to work against one of the anchor pins 40 in one direction of rotation of the drum 2, and against the other anchor pin in the other direction of rotation.

The cam 42 and lever 44 are designed so that the following roller 46 normally rides out to a point adjacent the end of the cam when the brake is actuated. As the brake lining 35 wears, however, the roller 46 will move closer to the end of the cam. When the lining or band 35 wears to such an extent that the movement of the brake band, or the spreading of the ends thereof, permits the following roller 46 to pass over an end of the cam 42 the brake will still function, because the opposite side of the cam plate is provided with sloping edges 48 which act as a cam surface. Thus the brake would instantaneously release itself and then engage again. The slope of the latter cam surface is preferably considerably steeper than the normally used cam surface 43; the object being to cause the brake action to become more sensitive as an indication to the operator that the lining has worn to such an extent as to require replacement.

Means are provided for actuating a brake on another wheel of the vehicle by the operation of the mechanism just described. A crank 52 is secured on the outer end of the shaft 45; a collar 53 being provided on the shaft, between the backing plate 11 and the lever 44, as a spacer to position the lever. A rod 54 is provided for connecting the crank 52 with an operating lever on a brake of another wheel. This method of operating one brake from another is disclosed in detail in my Patent No. 1,911,352, issued May 30, 1933. Thus, in the present mechanism rotation of the lever 44 by the cam 42 will rotate the shaft 45 and turn the crank 52. Since the crank 52 is connected to the operating lever of another brake by the rod 54, the turning of the crank 52 functions to operate the other brake. A spring 55 is provided between the lever 52 and the backing plate 11. The arrangement of the spring is such that it acts to maintain the roller 46 in contact with the cam surface 43 and, by virtue of the arrangement of the parts, to return the toggle to its neutral position and to release the brake.

Operation

Considering that the front and rear wheels of an automobile are equipped with the brake mechanism embodying my invention, a pressure is applied to the foot pedal in the usual manner in order to slow down or stop the car. This action engages the clutches in the rear wheel brakes, and causes the clutch member 13 to turn in the direction of the wheel rotation. As a result, the cam plate 42 is rotated to move the curved lever 44 outwardly. This outward movement tensions the connecting link 49 and causes the toggle links 41 to spread. Consequently, the opposing ends of the brake band 35 are spread apart to move the band into engagement with the drum 2.

Upon engaging the drum, the band rotates slightly until one end of the band is stopped by an anchor pin 40. The brake band now binds against the drum to retard its rotation. Upon release of the pressure of the foot pedal the clutch member 13 is disengaged, and the cam plate 42 rotated back to its neutral position by the pressure of the roller 46 on the surface 43; the pressure being caused by the action of the spring 55. When the brake band 35 becomes too worn, the engaging movement of the band allows an outward swing of the arm 44 which is sufficient to permit the cam end to force past the arm and cause the follower 46 to work on the opposite cam surface. Ordinarily the stiffness of brake application which causes the follower to first ride over the end of the cam is not attained immediately again. As a result, the brake operates as usual, except that the follower roller is riding on the cam surface 48 instead of the cam surface 43. The cam surface 48 however is shaped differently than the cam surface 43 and causes the brake to engage more rapidly. This notifies the driver that the lining needs replacement. If the brake band is applied stiffly again, or if the lining is allowed to wear still further, the follower roller will again ride over the end of the cam and permit the latter to reverse. The reversal of course is transmitted to the foot of the operator and he is further warned of the condition of his brake band. When the brake lining becomes so worn that the cam is free to rotate past the follower roller 46 the action will be to swing the follower arm 44 in and out, with an intermittent engagement and release of the brake band. This indicates that the lining is in very bad shape.

Another important feature of the construction is that there are no springs contained within the mechanism; the spring 55 serving to release the brake and return the parts to their normal positions. Replacement of this spring may be accomplished very readily without the necessity of dismantling the brake mechanism as is necessary in existing mechanisms.

It is also to be noted that, since the force for engaging the brake band 35 and drum 2 is derived largely from the rotation of the drum, the braking force is proportional to the movement being retarded. Consequently, there will be no skidding or sliding of the wheels when the brakes are applied. Furthermore, the brakes do not require adjustment, and the mechanism may be used constantly without worry or trouble. These features, coupled with the fact that they exist in a comparatively simple mechanism, lead to a brake construction possessed of particular merit in practical applications.

I claim:

1. A brake comprising a brake drum, a brake band engageable with the drum, mechanism including a cam having a plurality of cam surfaces for moving the brake band into engagement with the drum, one of said cam surfaces operating to actuate the band more rapidly than another of said surfaces, means controlled by the movement of the band for conditioning said mechanism to actuate the band by one of the cam surfaces in the normal operation of the brake and by another cam surface after the brake has become substantially worn out, and means for rotating the cam.

2. A brake comprising a brake drum, a brake band engageable with said drum, a cam having a plurality of cam surfaces, a cam follower adapted to ride on said surfaces and operably connected to actuate the band upon rotation of the cam, means controlled by the movement of said band for positioning the cam with said follower on one of the cam surfaces in the normal operation of the brake and on another surface after the brake band has become substantially worn out, and means for rotating the cam.

3. A brake comprising a brake drum, a brake band engageable with said drum, a cam having a plurality of cam surfaces, a cam follower adapted to ride on said surfaces and operably connected to actuate the band upon rotation of the cam, resilient means for holding the follower against the cam, means controlled by the movement of said band for positioning the cam with said follower on one of the cam surfaces in the normal operation of the brake and on another surface after the brake band has become substantially worn out, and means for rotating the cam.

4. A brake comprising a brake drum, a brake band engageable with said drum, a cam having two cam surfaces, a cam follower adapted to ride on either one or the other of said surfaces and operably connected to actuate the band upon rotation of the cam, one of said surfaces acting to actuate the band more rapidly than the other, means controlled by the movement of said band for positioning the cam with said follower on one of the cam surfaces in the normal operation of the brake and on another surface after the brake band has become substantially worn out, and means for rotating the cam.

5. A brake comprising a brake drum, a brake band engageable with said drum, a toggle connecting the ends of said band, a cam having two cam surfaces, a cam follower adapted to ride on either one or the other of said surfaces and operably connected to actuate the toggle and spread the ends of the band to actuate the brake band upon rotation of the cam, means controlled by the amount of spreading of said band ends for positioning the cam with said follower on one of the cam surfaces in the normal operation of the brake and on another surface after the brake band has become substantially worn out, and means for rotating the cam.

6. A brake comprising a brake drum, a brake band engageable with said drum, a rotatable clutch engageable with the brake drum, a cam connected for rotation with the clutch and having a plurality of cam surfaces, a cam follower adapted to ride on said surfaces and operably connected to actuate the band upon rotation of the cam, means controlled by the movement of said band for positioning the cam with said follower on one of the cam surfaces in the normal operation of the brake and on another surface after the brake band has become substantially worn out, and means for shifting the clutch into engagement with the brake drum.

7. A brake comprising a brake drum, a brake band engageable with said drum, a rotatable clutch engageable with the brake drum, a cam connected for rotation with the clutch and having a plurality of cam surfaces, a cam follower adapted to ride on said surfaces and operably connected to actuate the band upon rotation of the cam, means controlled by the movement of said band for positioning the cam with said follower on one of the cam surfaces in the normal operation of the brake and on another surface after the brake band has become substantially worn out, one of said surfaces acting to actuate the band more rapidly than another surface, and means for shifting the clutch into engagement with the brake drum.

8. A brake mechanism comprising a backing plate, a brake drum, a brake band engageable with said drum, a rotatable clutch within the brake drum and engageable therewith, a cam connected with the clutch and having a plurality of cam surfaces, a cam follower adapted to ride on said surfaces and operably connected to actuate the band upon rotation of the cam, means controlled by the movement of said band for positioning the cam with said follower on one of the cam surfaces in the normal operation of the brake and on another surface after the brake band has become substantially worn out, a push rod slidable through the backing plate and connected to shift the clutch into engagement with the brake drum, and means for moving the push rod.

9. A brake mechanism comprising a backing plate, a brake drum, a brake band engageable with said drum, a rotatable clutch within the brake drum and engageable therewith, a cam connected with the clutch and having a plurality of cam surfaces, a cam follower adapted to ride on said surfaces and operably connected to actuate the band upon rotation of the cam, means controlled by the movement of said band for positioning the cam with said follower on one of the cam surfaces in the normal operation of the brake and on another surface after the brake band has become substantially worn out, a push rod slidable through the backing plate and connected to shift the clutch into engagement with the brake drum, and means including a toggle for moving the push rod.

CHARLES W. COLLINS.